(12) United States Patent     (10) Patent No.: US 7,200,018 B2
Komulainen     (45) Date of Patent: Apr. 3, 2007

(54) CHARGING OF A FILTER CAPACITOR IN THE INTERMEDIATE CIRCUIT OF A FREQUENCY CONVERTER

(75) Inventor: Risto Komulainen, Klaukkala (FI)

(73) Assignee: Vacon Oyj, Vaasa (FI)

( * ) Notice: Subject to any disclaimer, the term of this patent is extended or adjusted under 35 U.S.C. 154(b) by 144 days.

(21) Appl. No.: 11/001,032

(22) Filed: Dec. 2, 2004

(65) Prior Publication Data

US 2005/0168897 A1    Aug. 4, 2005

(30) Foreign Application Priority Data

Dec. 5, 2003    (FI)   ................................. 20031780

(51) Int. Cl.
    *H02M 7/68*     (2006.01)
    *H02M 7/04*     (2006.01)
(52) U.S. Cl. ........................ 363/98; 363/136; 363/37
(58) Field of Classification Search .................. 363/37, 363/40, 135, 136, 132, 96, 98; 323/242
See application file for complete search history.

(56) References Cited

U.S. PATENT DOCUMENTS

| 3,987,356 | A | * | 10/1976 | Steigerwald | .................. | 363/44 |
| 4,437,050 | A | * | 3/1984 | Overzet | ....................... | 318/798 |
| 4,811,189 | A | | 3/1989 | Harvest et al. | | |
| 5,412,557 | A | * | 5/1995 | Lauw | ........................... | 363/37 |
| 6,188,589 | B1 | * | 2/2001 | Okayama et al. | .............. | 363/58 |
| 6,278,320 | B1 | * | 8/2001 | Vu | .............................. | 327/539 |

FOREIGN PATENT DOCUMENTS

| FI | 111671 B | 8/2003 |
| JP | 1-308170 A | 12/1989 |

* cited by examiner

*Primary Examiner*—Bao Q. Vu
(74) *Attorney, Agent, or Firm*—Birch, Stewart, Kolasch & Birch, LLP

(57) ABSTRACT

A method and an apparatus for charging a filtering capacitor in the direct-voltage intermediate circuit of a voltage-controlled PWM frequency converter comprising a rectifier (20) connected to an alternating-current source ($U_R$, $U_S$, $U_T$), a direct-voltage intermediate circuit and an inverter unit (11)/inverter units for feeding a multi-phase alternating voltage ($U_U$, $U_V$, $U_W$) of variable frequency into a load/loads (12), said rectifier bridge having controlled semiconductor switches (V1–V3), especially thyristors, in one arm, preferably in the upper arm, and diodes (D1–D6) in the other arm, preferably the lower arm, and said direct-voltage intermediate circuit being provided with a capacitor unit ($C_{DC}$) of a relatively high capacitance for filtering the voltage. The filtering capacitor is charged by means of the semiconductor switches of the rectifier bridge by adjusting their firing angle according to the measured voltage of the capacitor unit, and the firing angle is adjusted by forming the sum of the measured voltage ($U_{DC}$) of the capacitor unit and a predetermined limit voltage ($U_{LIM}$) and comparing the said sum to the measured main voltages of the supply network.

9 Claims, 3 Drawing Sheets

CHARGING OF A FILTER CAPACITOR IN THE INTERMEDIATE CIRCUIT OF A FREQUENCY CONVERTER

The present invention relates to a method and an apparatus for charging a filter capacitor in the intermediate circuit of a voltage-controlled PWM frequency converter.

In PWM-frequency converters (frequency converters controlled by pulse-width modulation), a three-phase alternating voltage (phase voltages $U_R$, $U_S$, $U_T$) of a supply network is rectified in a rectifier unit (rectifier bridge 10, FIG. 1), the direct voltage $U_{DC}$ produced is filtered by means of a relatively large capacitor unit $C_{DC}$ and finally an alternating voltage (phase voltages $U_U$, $U_V$, $U_W$) of desired frequency and magnitude is produced in an inverting or inverter unit (inverter bridge 11). The rectifier and inverter units may be mechanically separate from each other and the same rectifier unit can supply several inverter unit. The frequency converter may feed e.g. a three-phase cage induction motor (M) 12.

Figure 2:
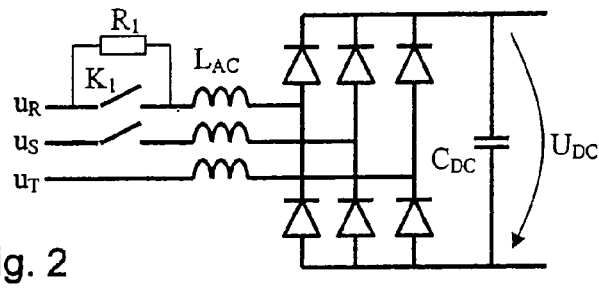
Figure 3:
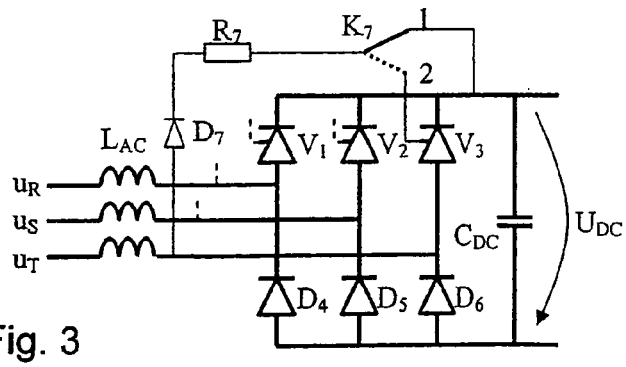
Figure 4:
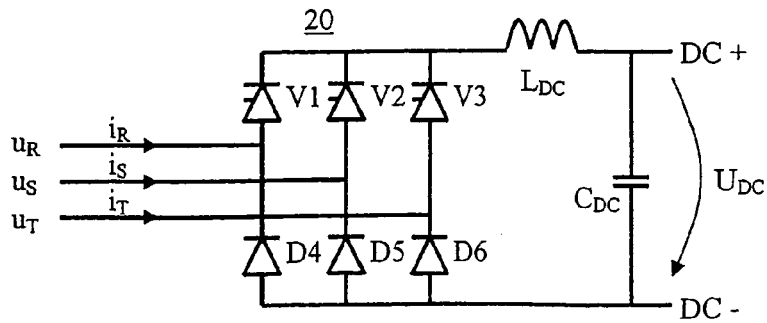

The rectifier bridge is typically either a non-controlled full-wave bridge, consisting of diodes (FIGS. 1 and 2), or a half-controlled bridge, consisting of thyristors and diodes (FIGS. 3 and 4).

Due to the large capacitor unit, the frequency converter can not be connected directly to the supply network, but the capacitors have to be first charged almost to their final voltage to avoid a large switching current surge. According to prior art, the charging of the capacitors is generally implemented by using a charging resistor e.g. as illustrated in FIGS. 2 and 3.

In the method according to FIG. 2, the rectifier circuit is a diode bridge and the charging occurs via a contactor $K_1$ and a charging resistor $R_1$. The contactor is connected to two phases of the circuit feeding the frequency converter. In an initial situation, the contactor is open and the intermediate circuit capacitor $C_{DC}$ is charged via the charging resistor $R_1$ and the diode bridge. Once the intermediate circuit has been charged to a sufficient level, a control unit closes the contactor.

In the method according to FIG. 3, the rectifier circuit is a diode-thyristor bridge (thyristors V1–V3 in the upper arm and diodes D4–D6 in the lower arm). In this figure, the charging is described by way of example for the T phase only. In the other two phases, an identical circuit is used. In an initial situation, the relay $K_7$ is in position 1 and a charging circuit is set up between supply phase $u_T$ and one of the other supply phases via the route $D_7$-$R_7$-$K_7$-$C_{DC}$— lower arm diode. Once the intermediate circuit has been charged to a sufficient level, the relay is turned to position 2, so the upper arm thyristor receives a firing pulse as soon as the corresponding phase voltage is more positive than the +terminal of the intermediate circuit. After this, the operation of the bridge corresponds to completely to the operation of a diode bridge.

The drawbacks of prior-art methods based on the use of a charging resistor include the following:

the charging resistor is an extra component that has to be rated according to the intermediate circuit capacitance in the method according to FIG. 2, a contactor rated for the main circuit current is needed, and if the intermediate circuit is in a shorted condition in the initial situation, the charging resistor is destroyed in both methods, because for an economical rating it is only necessary to take into account the instantaneous dissipation required by the charging.

The object of the present invention is to overcome the drawbacks of prior art and achieve a charging arrangement of a new type. In the arrangement of the invention, the charging of the capacitors is performed in a thyristor bridge exclusively by controlling the firing angle of the thyristors. The features of the solution of the invention are presented in detail in the claims below.

As compared to traditional methods, the disclosed principle provides several advantages, such as:

no charging resistor is needed at all, the magnitude of the intermediate circuit capacitance has no effect on the performance of the charging process, if several rectifier bridges are connected in parallel, the order in which they are connected to the mains has no importance, in other words, they can charge a common intermediate circuit either in parallel or separately, if the intermediate circuit is shorted, the charging current remains under control and nothing is destroyed, and the control principle is simple, so it can be implemented by a simple and economical control logic.

Figure 1:
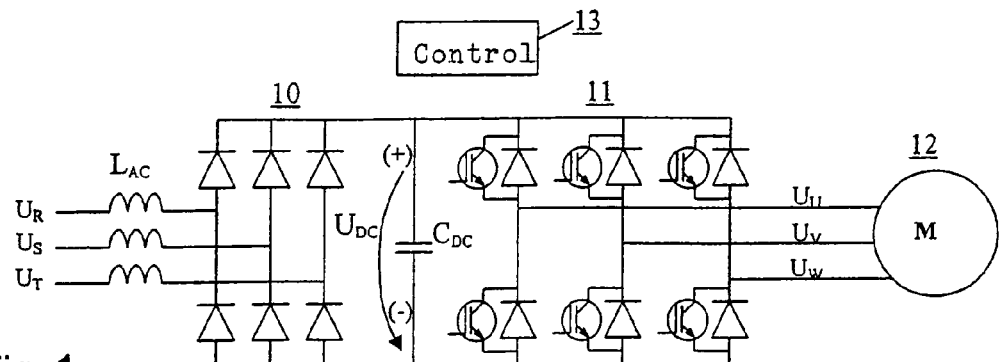
Figure 5:
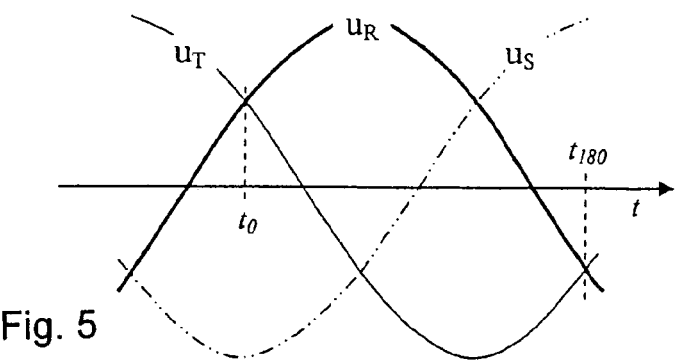
Figure 6:
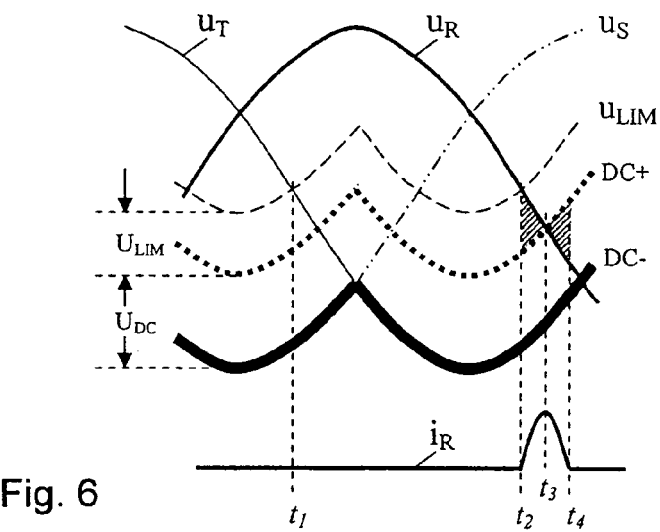
Figure 7:
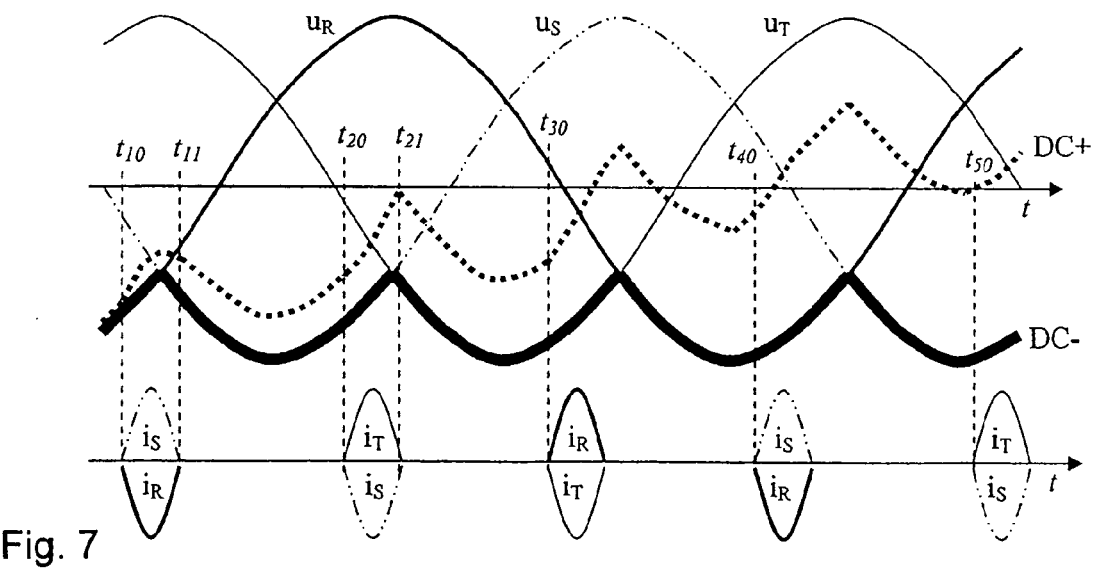
Figure 8:
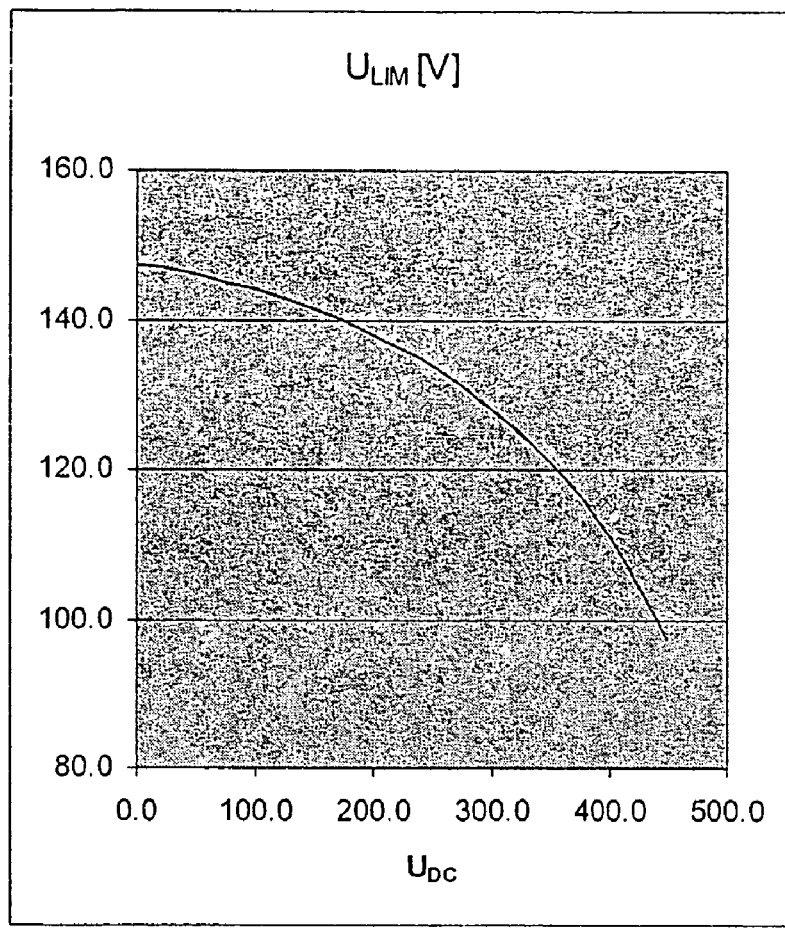
Figure 9:
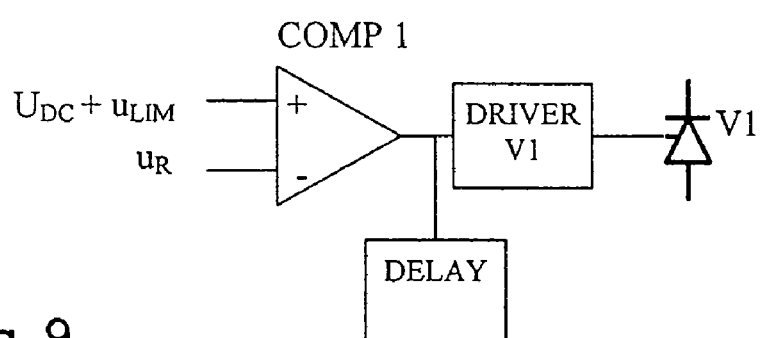

In the following, the invention will be described in detail with reference to an example and the attached drawings, wherein FIG. 1 represents a prior-art voltage-controlled PWM frequency converter and a cage induction motor as its load, FIG. 2 represents a prior-art method of charging the intermediate circuit by means of a charging resistor, FIG. 3 represents another prior-art method of charging the intermediate circuit by means of a charging resistor, FIG. 4 represents an embodiment of a rectifier circuit in which the charging method of the invention can be applied, FIG. 5 represents the definition of firing angle in the charging method of the invention, FIG. 6 represents the limit value voltage and the generation of a charging current pulse, FIG. 7 represents the progress of the charging process by the method of the invention, FIG. 8 presents an example of the limit value of the firing voltage, and FIG. 9 illustrates the indication of the firing instant of the thyristors in the charging method of the invention.

In the charging method of the invention, the rectifier circuit used is a diode-thyristor bridge of the same type as in the prior-art solution (20, FIG. 4) illustrated in FIG. 3. The charging is implemented by adjusting the firing angle of the thyristors according to the measured intermediate circuit voltage in such manner that initially, when the intermediate circuit voltage $U_{DC}$ is low, the firing angle is very large, and as the intermediate circuit is getting charged, the firing angle is diminished according to the measured intermediate circuit voltage.

In the method of the invention, a pulsating charging current is used. To keep the current pulses under control, it is required, in addition to phase angle control, that a three-phase AC inductor $L_{AC}$ is connected between the mains and the rectifier circuit as shown in the example in FIG. 3 or that a DC inductor $L_{DC}$ is connected between the rectifier circuit and the filter capacitor of the direct-voltage circuit e.g. as shown in FIG. 4. Such inductors are used in prior art to limit mains current harmonics, and the use of the charging method of the present invention does not impose any additional requirements regarding the rating of the inductor. In the description of the invention, reference is made to an inductor solution as illustrated in FIG. 4 to make things more readily understandable, but the method works just as well with an AC inductor solution, as is obvious to the skilled person.

The firing angle of the diode-thyristor bridge is the angle after the earliest possible firing instant at which the thyristor is fired. For example, in FIG. 5 firing angle 0° (the earliest possible firing instant) of the R-phase thyristor V1 means instant $t_0$, at which phase voltage $U_R$ becomes more positive than phase voltage $u_T$. Correspondingly, firing angle 180° (the latest possible firing instant) corresponds to instant $t_{180}$.

The adjustment of the firing angle is based on the voltage difference between the measured intermediate circuit voltage and the measured main voltage in the following manner:

The thyristor is fired when the phase voltage measured against the DC potential (the phase voltage being the same as the main voltage because, due to the diodes D4–D6, the DC potential continuously follows the most negative phase voltage) falls below the predetermined limit value $u_{LIM}$ added to the measured intermediate circuit voltage $U_{DC}$ (FIG. 6). In the example in FIG. 6, such a situation occurs for phase T at instant t1, at which thyristor V3 is fired, and for phase R at instant t2, at which thyristor V1 is fired. When the thyristor is fired, there follows a current pulse whose amplitude is determined by the time integral of the voltage between the main voltage and the intermediate circuit voltage between the firing instant and the instant when the main voltage falls below the intermediate circuit voltage (shaded area between t2 and t3). This current pulse charges the intermediate circuit capacitor $C_{DC}$ and it ends due to the negative time interval between the main voltage and the intermediate circuit voltage (shaded area between t3 and t4).

To keep the charging current pulses under control, the limit value $U_{LIM}$ of the voltage difference is a function of the intermediate circuit voltage, such that the limit value decreases as the intermediate circuit voltage rises. Reducing the limit value is an expedient for keeping the voltage area increasing the charging current constant, thus keeping the amplitude of the charging current pulse constant as well.

In the following, the method will be described in more detail.

The charging of the intermediate circuit under firing angle control progresses according to FIG. 7 as follows. The figure does not show the limit value curve $U_{LIM}$.
1. Before instant $t_{10}$
   the intermediate circuit voltage is 0
   the DC potential follows phase R, whose instantaneous value is the most negative
2. At instant $t_{10}$
   The S-phase thyristor V2 is fired when the main voltage $[u_S-u_R]$ falls below the limit value
3. Time interval $t_{10}-t_{11}$
   a charging current pulse is transmitted via phases S and R, charging the intermediate circuit capacitor
4. Time interval $t_{11}-t_{20}$
   UDc remains unchanged and the DC potential follows phase S, which is the most negative
5. At instant $t_{20}$
   the main voltage $[u_T-u_S]$ falls below the limit value, so the T-phase thyristor V3 is fired
6. Time interval $t_{20}-t_{21}$
   a charging current pulse passes via phases T and S, charging the intermediate circuit capacitor a little more
7. And so on. The charging process goes on in the above-described manner until $U_{DC}$ finally reaches the limit value at which the thyristors can be turned fully on.

It is preferable to apply an arrangement whereby the charging current pulses become at least roughly equal according to the ratings of the main circuit components. Therefore, the voltage limit value below which the thyristor is fired is advantageously lowered as the intermediate circuit voltage rises (with a constant limit curve the charging current would increase with the progress of the charging process).

FIG. 8 presents an example case regarding this question. In the example, the peak value of the charging current pulse remains at a magnitude of 400 A when the limit value is adjusted according to the figure and the other main circuit values relevant to the charging are:
$U_{mains}$=400V
$F_{mains}$=50 Hz
$L_{AC}$=70 µH/phase
$C_{DC}$=10 mF In a practical implementation, the curve shown in the figure can be replaced by a straight line connecting the end points of the curve. This will only have the consequence that the charging current pulses are somewhat smaller in the intermediate range, which is why the charging process is a little longer. It is also possible to keep the limit value constant, in which case the charging current pulse will increase with the progress of the charging process.

An example circuit designed to apply the method is presented in FIG. 9 for phase R. The simplified thyristor control circuit comprises a comparator COMP1, one input of which is fed by the sum of the measured direct voltage $U_{DC}$ and the limit value $U_{LIM}$ and the other input is fed by the measured main voltage [$u_R$–DC—]. Connected to the output of the comparator is a gate driver DRIVER V1, which controls the thyristor V1. The comparator output COMP1 rises up at instant t30 (FIG. 7) when the measured main voltage falls below the limit value level of the second input of the comparator.

Firing of the wrong thyristor (such as e.g. T-phase thyristor V3 within time interval $t_{30}-t_{40}$ in FIG. 7, during which the output of the comparator of this phase is high for part of the time) can be prevented e.g. by using a time delay that blocks all driving signals for a few ms after thyristor V1 has received a firing pulse.

It is obvious to the person skilled in the art that different embodiments of the invention are not limited to the example described above, but that they may be varied within the scope of the claims presented below.

The invention claimed is:
1. A method for charging a filtering capacitor comprising:
   providing a voltage-control PWM frequency converter, including:
      a rectifier connected to an alternating current source;
      a direct voltage intermediate circuit;
      at least one inverter unit for feeding a multi-phase alternating voltage of variable frequency into at least one load;
      said rectifier having a bridge of controlled semiconductor switches in one arm and diodes in another arm;
      said direct voltage intermediate circuit being provided with a filtering capacitor of relatively high capacitance for filtering said multi-phase alternating voltage;
   charging the filtering capacitor by the semiconductor switches by adjusting a firing angle according to a measured voltage of the filtering capacitor;
   the firing angle being adjusted by forming a sum of the measured voltage of the filtering capacitor and a pre- determined limit voltage, the limit voltage being a function of the voltage of the filtering capacitor so that the limit voltage decreases as the filtering capacitor voltage increases so as to keep charging current pulses under control; and comparing the sum to measured main voltages of a supply network.

2. The method according to claim 1 wherein the firing angle is adjusted by a voltage difference between the measured voltage of the filtering capacitor and the measured main voltage so that each semiconductor switch, is fired when the value of the corresponding measured main voltage falls below the sum of the measured voltage of the filtering capacitor and the predetermined limit voltage.

3. The method according to claim 1, wherein the semiconductor switches are thyristors.

4. An apparatus for charging a filtering capacitor in a PWM frequency converter, said converter comprising:
   a control unit;
   a rectifier connected to an alternating current source;
   a direct voltage intermediate circuit;
   at least one inverter unit for feeding a multi-phase alternating voltage of variable frequency into at least one load;
   said rectifier including a bridge of controlled semiconductor switches in one arm and diodes in another arm;
   said direct voltage intermediate circuit including a filtering capacitor of relatively high capacitance for filtering the multi-phase alternating voltage;
   the control circuit adjusting the firing angle of the semiconductor switches in accordance with a measured voltage of the filtering capacitor, by measuring the voltage of the filtering capacitor and adding a predetermined limit voltage, the limit value being a function of the filtering capacitor voltage such that the limit voltage decreases as the filtering capacitor voltage increases, thereby keeping the charging current pulses under control; and
   the control unit adjusting the firing angle by comparing said sum to a measured main voltage of a supply network;
   whereby said filtering capacitor is charged.

5. The apparatus according to claim 4, wherein the control unit adjusts the firing angle by a voltage difference between the measured voltage of the filtering capacitor and the measured main voltage so that each semiconductor switch, is fired when the value of the corresponding measured main voltage falls below the sum of the measured intermediate circuit voltage and the predetermined limit voltage.

6. The apparatus according to claims 4 and 5, wherein that the control unit employs a time delay to prevent firing a wrong semiconductor switch, during which delay the firing of all the semiconductor switches is prevented, said delay being given after each firing pulse.

7. The apparatus according to claim 4, wherein the semiconductor switches are thyristors.

8. An apparatus for charging a filtering capacitor in a PWM frequency converter, said converter comprising:
   a control umt;
   a rectifier connected to an alternating current source;
   a direct voltage intermediate circuit;
   at least one inverter unit for feeding a multi-phase alternating voltage of variable frequency into at least one load;
   said rectifier including a bridge of controlled semiconductor switches in one arm and diodes in another arm;
   said direct voltage intermediate circuit including a filtering capacitor of relatively high capacitance for filtering the multi-phase alternating voltage;
   the control circuit adjusting the firing angle of the semiconductor switches in accordance with a measured voltage of the filtering capacitor, by measuring the voltage of the filtering capacitor and adding a predetermined limit voltage;
   the control unit adjusting the firing angle by comparing said sum to a measured main voltage of a supply network;
   the control circuit including at least a comparator, one input of which receives the said sum of the voltage of the filtering capacitor and the limit voltage, and another input receives the measured main voltage, the control circuit further including a gate driver connected to an output of said comparator;
   whereby said filtering capacitor is charged.

9. The apparatus according to claim 8, wherein the semiconductor switches are thyristors.

* * * * *